United States Patent [19]
Payne

[11] Patent Number: 5,620,169
[45] Date of Patent: Apr. 15, 1997

[54] ROTARY MOUNT INTEGRAL FLEXURAL PIVOT WITH BLADES WHICH ARE INTEGRALLY INTERCONNECTED AT THE BLADE INTERSECTION

[75] Inventor: Dan A. Payne, Morrison, Colo.

[73] Assignee: Ball Corporation, Muncie, Ind.

[21] Appl. No.: 333,496

[22] Filed: Nov. 2, 1994

[51] Int. Cl.⁶ .................................................. F16D 1/00
[52] U.S. Cl. ........................... 267/160; 403/291; 248/609
[58] Field of Search ............................... 267/140.12, 160; 248/565, 567, 590, 608, 609; 403/291; 74/5 F; 29/436

[56] References Cited

U.S. PATENT DOCUMENTS

| | | | |
|---|---|---|---|
| 3,181,851 | 5/1965 | Troeger | 267/160 |
| 3,181,918 | 5/1965 | Troeger | 403/291 |
| 3,252,696 | 5/1966 | Friedel | 403/291 |
| 3,465,997 | 9/1969 | Piske | 267/160 |
| 3,807,029 | 4/1974 | Troeger | 29/436 |
| 3,811,665 | 5/1974 | Seelig | 267/160 |
| 3,813,089 | 5/1974 | Troeger | 267/160 |
| 3,825,992 | 7/1974 | Troeger | 29/436 |
| 4,261,211 | 4/1981 | Haberland | 267/160 |
| 4,327,527 | 5/1982 | Seelig et al. | 51/416 |
| 4,802,720 | 2/1989 | Paulsen | 350/6.6 |
| 4,802,784 | 2/1989 | Brooks | 267/160 |
| 4,812,072 | 3/1989 | Brooks | 403/291 |
| 4,997,123 | 3/1991 | Backus et al. | 228/182 |

Primary Examiner—Robert J. Oberleitner
Assistant Examiner—Chris Schwartz
Attorney, Agent, or Firm—Sheridan Ross P.C.

[57] ABSTRACT

A rotary mount flexural pivot is disclosed which is integrally formed from a single piece of feed stock and which uses no mechanical connections. Two hollow cylindrical mounts are axially aligned and at least two flexural members are disposed on the interior of these two mounts, are integrally interconnected with each of these two mounts, and cross to define an intersection. These two flexural members are integrally interconnected with each other along the entire extent of this intersection. The mounts therefore move relative to each other by a relative rotation about the flexural member intersection.

7 Claims, 5 Drawing Sheets

ROTARY MOUNT INTEGRAL FLEXURAL PIVOT WITH BLADES WHICH ARE INTEGRALLY INTERCONNECTED AT THE BLADE INTERSECTION

FIELD OF THE INVENTION

The present invention generally relates to flexural pivots for supporting a mechanism which is to be limitedly rotated/pivoted about an axis and, more particularly, to a flexural pivot in which the mounts and flexure members/blades are integrally formed.

BACKGROUND OF THE INVENTION

A variety of designs of flexural pivots have been proposed for mounting a movable structure (e.g., an oscillating mirror) to a fixed support. Generally, flexural pivots utilize two mounts (e.g., two axially aligned, cylindrical housings) and typically a plurality of flexure members or blades. Each of the flexure members/blades in known flexural pivots are separately and mechanically attached (e.g., via brazing, clamping) to both of the mounts, but are not directly attached to each other. The flexure members/blades allow a limited degree of rotation or pivoting of one mount relative to the other while providing a degree of "torsional-like" resistance to such movements.

The mounts of the flexural pivot interconnect the two desired structures, such as a fixed support and an oscillating mirror. One type of mount which has been utilized for flexural pivots is a pair of substantially cylindrical and axially aligned housings. Generally, each of these housings have a cylindrical end structure with an arcuately-shaped tab (e.g., less than 180°) projecting from an end of the cylindrical end structure. When assembled, the cylindrical end structures of the two housings are on opposite ends of the flexural pivot and the projecting tabs of the housings extend within the interior of the cylindrical end structure of the other housing. Consequently, when the flexure members/blades are inserted and disposed inside the housings (e.g., via a positioning of the flexure members/blades in preformed slots on the interior of the housings) and appropriately attached thereto (e.g., by brazing), the housings are movably interconnected by the flexure members/blades. Although it has been suggested to separately form each of the housings and each of the flexure members/blades (e.g., U.S. Pat. No. 4,997,123 to Backus et al., issued Mar. 5, 1991), it has also been suggested to form a cylindrical housing by milling a piece stock into the desired cylindrical shape, and thereafter form two housings therefrom by electrochemical or electron discharge and cutting operations (e.g., U.S. Pat. No. 3,807,029 to Troeger, issued Apr. 30, 1974; U.S. Pat. No. 3,813,089 to Troeger, issued May 28, 1974; U.S. Pat. No. 3,825,992 to Troeger, issued Jul. 30, 1974), prior to inserting a flexure member/blade assembly therein for attachment to the housings.

The above-noted types of flexural pivots are deficient in some respects. For instance, manufacturing costs associated with multiple-piece configurations are typically high. Moreover, the assembly of the multiple-piece flexural pivot necessitates the use of some type of mechanical joinder of the flexure members/blades to the mounts. In the case of brazing and the like, these joints are prone to fracture when the flexural pivot is subjected to vibration and shock loading. Furthermore, when brazing it utilized the potential exists for a condition commonly referred to as "bridging". Bridging occurs when the braze material used to join the mounts and flexure members/blades flows into the space between the two mounts and thus prevents independent movement of the mounts.

Many of the above-noted types of flexural pivots, namely those in which the flexure members/blades are not directly attached to each other, also suffer from a "decentering" of the mounts during relative movement between the mounts. Decentering is caused by the lack of a common axis of rotation/pivotation among the flexure members/blades which coincides with the axis of rotation/pivotation of the flexural pivot. Rotation or a pivoting of one mount relative to another mount is again achieved by a bending of the flexure members. Since in the noted configuration the flexure members/blades are not joined along a common axis, the members/blades bend along independent axes. This results in an uneven distribution of stresses among the flexure members/blades which causes a radial translation of one mount relative to the other mount during relative movement of the mounts. In certain applications, decentering adversely affects the precision of the mounted structure (e.g., an oscillating mirror).

Many of the above-noted types of flexural pivots also do not achieve maximum strength from the flexure members/blades. That is, in some configurations the flexure members are separately attached to the mounts only along a portion of the length of the mounts (e.g., to accommodate the assembly of the flexure members/blades prior to positioning such within the cylindrical housings). Strength would be increased if the flexure members/blades extended along the entire length of the mounts and were each attached to the mounts along this entire length. Relatedly, when all of flexure members/blades are not attached to the mounts along their entire length, this necessarily concentrates the stress at the above-noted mechanical joint(s) between the flexure members/blades and the mounts which often results in failure of the joint before failure of the flexure member. Similarly, the attachment of the flexure members/blades along the full length of the mounts and to each other at the centerline would result in higher stiffness in the five axes of motion other than the torsion axis. This would help maintain alignment of the rotating structure under dynamic loads.

SUMMARY OF THE INVENTION

The various aspects of the present invention are embodied in an integrally formed flexural pivot. Generally, a flexural pivot includes two typically displaced mounts, one of which is typically attached to a fixed support structure and the other of which is typically attached to a structure which is to be movable relative to the fixed support. At least one and typically a plurality of flexure members are each typically interconnected with each of the mounts. As such, the two mounts are movable relative to each other by a bending or flexing of the flexure member(s).

In one aspect of the present invention, at least one and preferably each flexure member is integrally formed with both of the mounts. That is, there is no mechanical interconnection (e.g., no brazed joint) between the noted flexure member(s) and either of the mounts. In another aspect of the present invention, there are at least two flexure members which are each interconnected with each of the two mounts (e.g., via an integral connection or a mechanical interconnection) and these two flexure members intersect and are connected directly to each other along at least a portion of this intersection (e.g., via an integral connection or a mechanical interconnection).

In each of the noted aspects, there are further features which may be associated with the present invention. For instance, the mounts may be effectively plates or substantially cylindrical and axially aligned housings. Moreover, all of the flexure members used in the flexural pivot may intersect and be joined (e.g., integrally, mechanically) along an entire length of the intersection, for instance to define an axis for the desired relative movement between the two mounts. Furthermore, the entire flexural pivot may be integrally formed such that each of the flexure members is integrally formed with both mounts and the flexural members intersect and are integrally formed at and along the entirety of their intersection.

Another aspect of the present invention relates to a method of making a flexural pivot, generally of the above-described type, from a solid, unitary piece of feed stock material. The method includes the steps of forming two displaced mounts from the feed stock material and forming at least one flexure member from this same feed stock material and which is interconnected with each of the mounts. More specifically, the forming of the flexure member is provided by creating at least two displaced openings through the feed stock material. That is, the initial formation of at least two displaced openings in the feed stock material produces, either from this operation or after subsequent operations such as an enlargening of the opening(s), the flexure member. This procedure may of course be repeated to form a plurality of flexure members.

In the above-noted aspect on the methodology, there are further features which may be associated with the present invention. Initially, the noted openings may be formed, such as by drilling or plunge electron discharge machining, and thereafter enlarged to define the flexure member, such as by wire electron discharge machining. This methodology is particularly applicable to forming an integral flexural pivot. For instance, in the case of where the mounts are of the axially aligned, cylindrical housing type, this methodology may be employed for creating the space between adjacent flexure members which are "interiorly" positioned (e.g., radially inward of the outer cylindrical surface of the pivot and thus defined by a closed perimeter). Moreover, in the case where the mounts are effectively two displaced plates with at least two intersecting flexure members extending therebetween, this methodology may be employed for creating the space(s) between adjacent flexure members which is/are "interiorly" located—that is the space(s) which have a closed perimeter defined by, for instance, two flexure members and a surface of one of the mounts. In either case, the methodology of utilizing electron discharge machining may be utilized to form an entire integral flexural pivot having the above-identified types of features.

DETAILED DESCRIPTION

Figure 1:
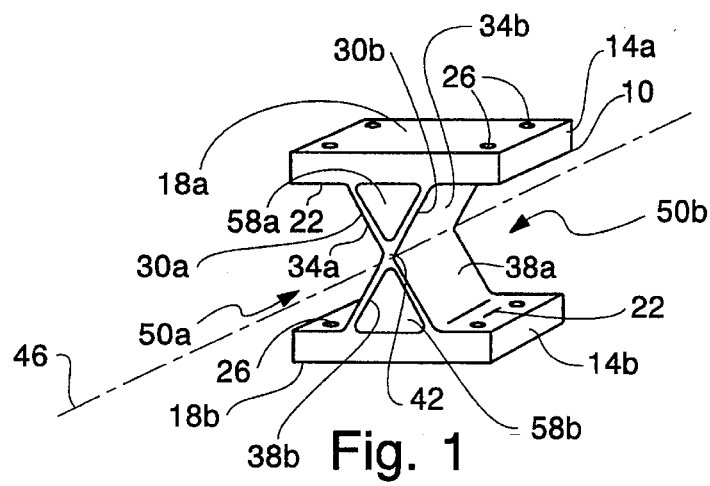
FIG. 1 is a perspective view of one embodiment of a flexural pivot.

The present invention will be described in relation to the accompanying drawings which assist in illustrating the various features thereof. An integral flexural pivot 10 (i.e., formed as a unitary structure as will be discussed below) is illustrated in FIG. 1. The pivot 10 includes upper and lower vertically displaced mounts 14a, 14b, respectively, having substantially planar first surfaces 18a, 18b, respectively, which interface with two separate structures (not shown) between which at least some degree of relative movement is desired (e.g., a fixed support and a scanning mirror) via use of the pivot 10. Screw holes 26 may be provided on each of the mounts 14 for securing the pivot 10 to these structures (not shown).

First and second flexure members 30a, 30b, respectively, extend between and are integrally formed/interconnected with each of the mounts 14. Furthermore, the flexure members 30a, 30b intersect to define and are integrally formed along the entire length of an intersection 42 which is positioned along an axis 46. Moreover, the flexure members 30 run substantially the entire length of the mounts 14. Consequently, when the mounts 14 are attached to their respective structures (not shown), they are able to move relative to each other, typically by a pivoting-like action substantially about the axis 46 coinciding with the intersection 42, by a flexing of the members 30. Although only two flexure members 30a, 30b are illustrated for the pivot 10, it will be appreciated that more may be utilized depending upon the application and/or the desired performance characteristics.

The flexure members 30 intersect to define a substantially "X" like pattern in the illustrated embodiment. As such, the upper part 34a of the first flexure member 30a and the lower part 38b of the second flexure member 30b (which define portions of the perimeter or exterior surface of the pivot 10), together with the second surfaces 22 of the mounts 14, collectively define an exteriorly positioned left opening 50a (i.e., the left opening 50b is not closed on one side thereof, and thus has an open perimeter portion). Moreover, the upper part 34b of the second flexure member 30b and the lower part 38a of the first flexure member 30a (which define portions of the perimeter or exterior surface of the pivot—10), together with the second surfaces 22 of the mounts 14, collectively define an exteriorly positioned right opening 50b (i.e., the right opening 50b is not closed on one side thereof, and thus has an open perimeter portion). Furthermore, the upper parts 34 of the flexure members 30, together with the second surface 22a the upper mount 14a, collectively define an upper, interiorly positioned opening 58a (i.e., having a closed perimeter), while the lower parts 38 thereof, together with the second surface 22b of the lower mount 14b collectively define a lower, interiorly positioned opening 58b (i.e., having a closed perimeter).

Figure 2A:
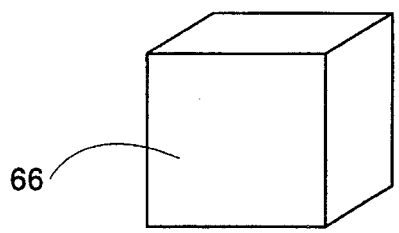
FIGS. 2A–D are sequential views of one method for making the flexural pivot of FIG. 1.
Figure 2B:
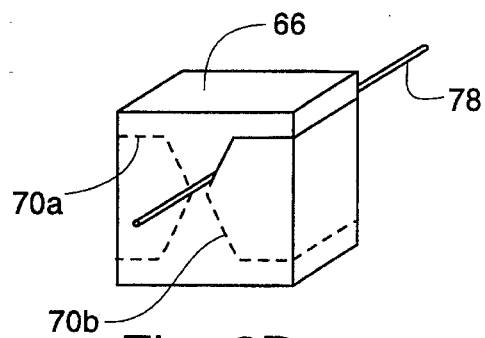
Figure 2C:
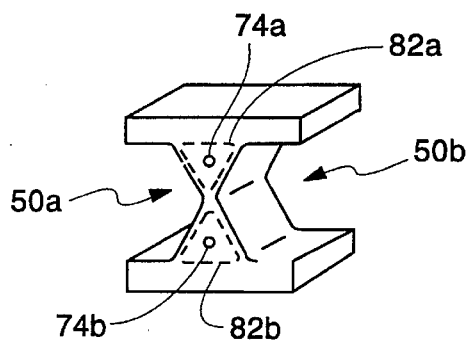
Figure 2D:
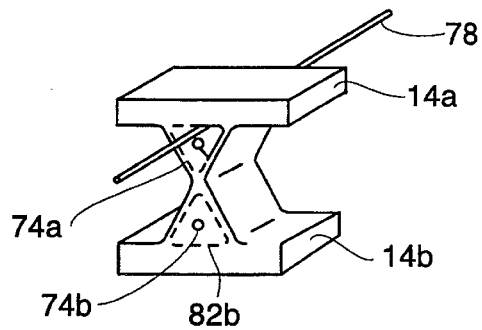

Referring to FIGS. 2A–D, one method for making the integral flexural pivot 10 is illustrated therein. Initially, since the flexural pivot 10 is integral as previously noted, it is formed from a single piece of feed stock 66 such as that illustrated in FIG. 2A. Referring to FIG. 2B, the boundaries of the two openings 50 are illustrated by the dashed lines 70. Electron discharge machining, through use of the wire electrode 78, may be utilized to cut along these dashed lines 70 to remove portions of the feed stock 66 to create the openings 50. Referring to FIGS. 2C, two vertically displaced pilot holes 74 are formed in the feed stock 66, such as by drilling, plunge electron discharge machining, or the like. In order to create the upper and lower openings 58a, 58b which are illustrated by the dashed lines 82a, 82b, respectively, in FIG. 2C, the pilot holes 74 must each be enlarged. Referring to FIG. 2D, a wire electrode 78 may be fed into a given pilot hole 74 and advanced along the associated dashed line 82 to create the associated opening 58 via wire electron discharge machining. This procedure may be repeated to form the other opening 58. It will be appreciated that the step associated with FIG. 2B may be performed before or after the steps associated with FIGS. 2C–D.

Based upon the foregoing, it will be appreciated that the method of FIGS. 2A–D provides for an integral flexural pivot 10. That is, there are no mechanical joints between the various noted parts (e.g., between the mounts 14 and the flexure members 30, between the flexure members 30 at the intersection 42). The described combination of operations which includes wire electron discharge machining is particularly advantageous in forming the integral flexural pivot 10. However, electron discharge machining operations leave a skin or a recast layer on the pivot 10 which may adversely affect its performance. As such, finishing processes such as extrusion honing (e.g., passing an abrasive slurry past the pivot 10), shot peening, or electropolishing may be utilized to substantially remove the recast layer (not shown).

Figure 3:
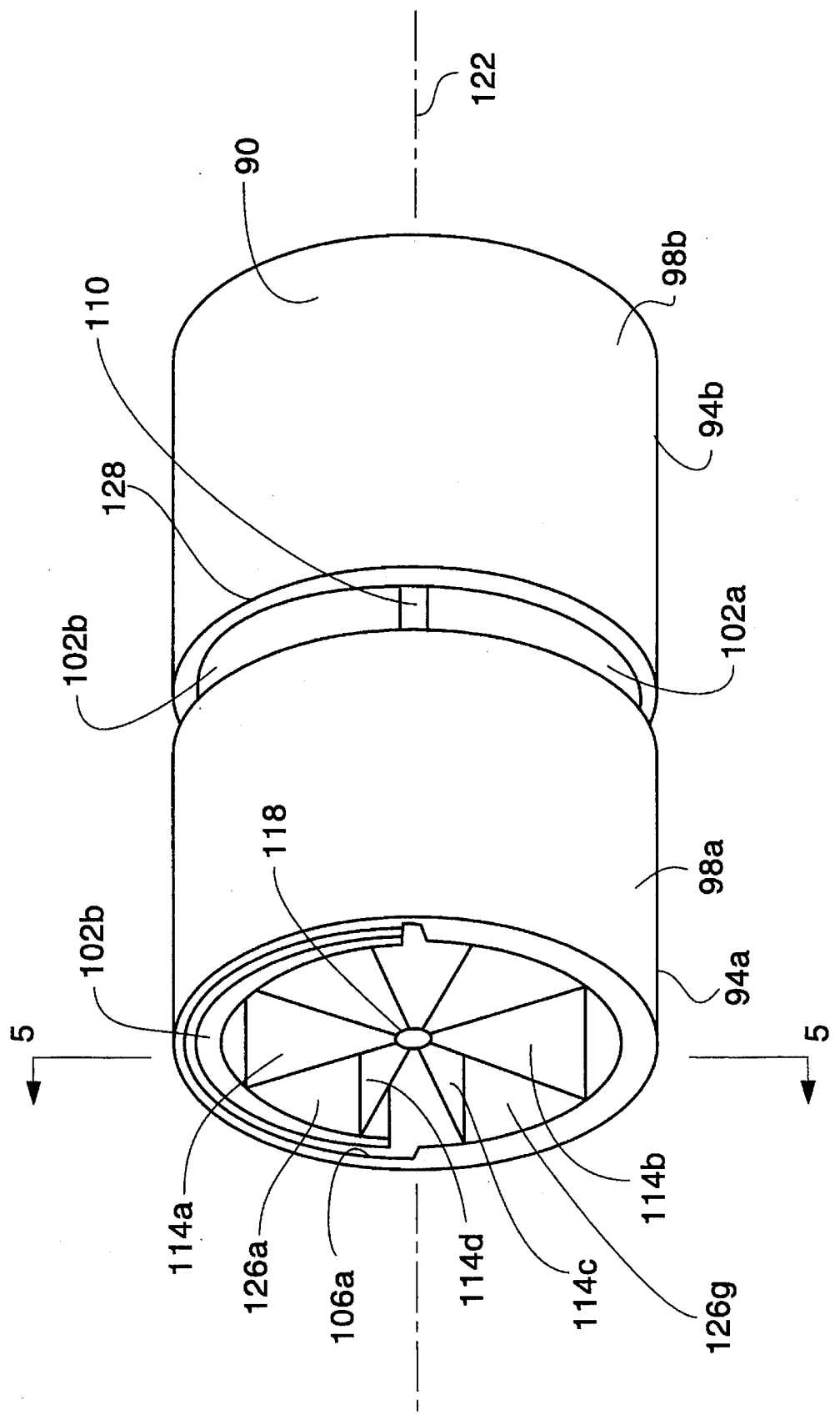
FIG. 3 is a perspective view of another embodiment of a flexural pivot.
Figure 4A:
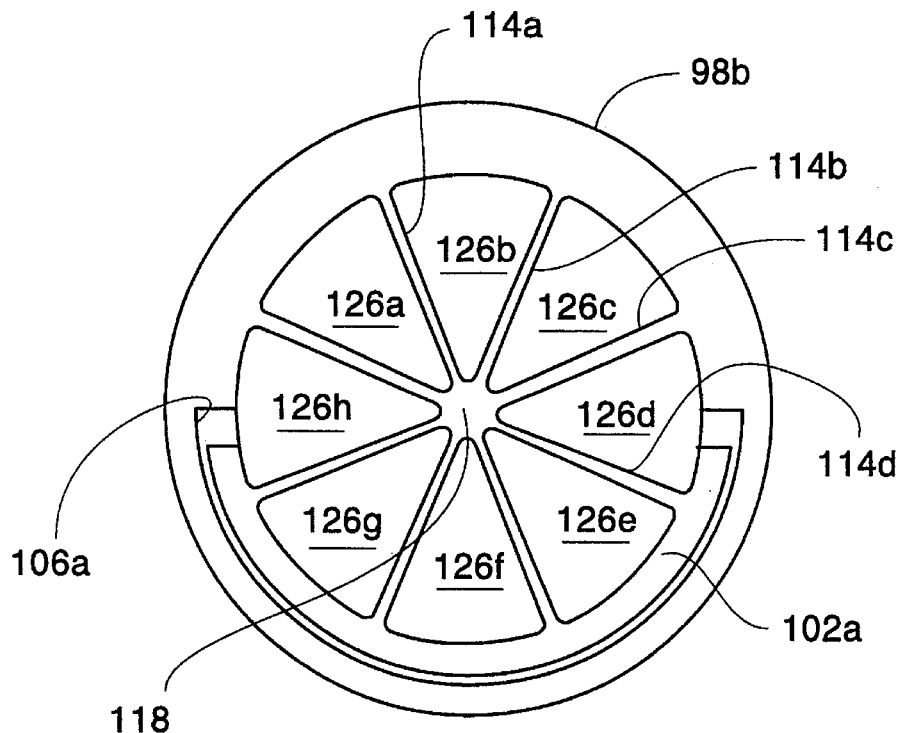
FIGS. 4A and 4B are end views of the flexural pivot of FIG. 3.
Figure 4B:
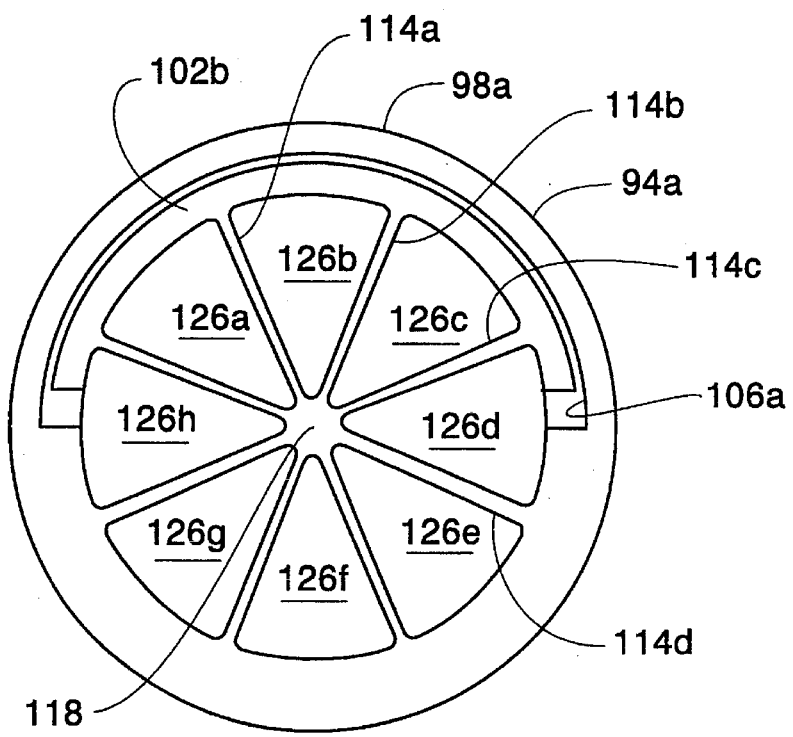
Figure 5:
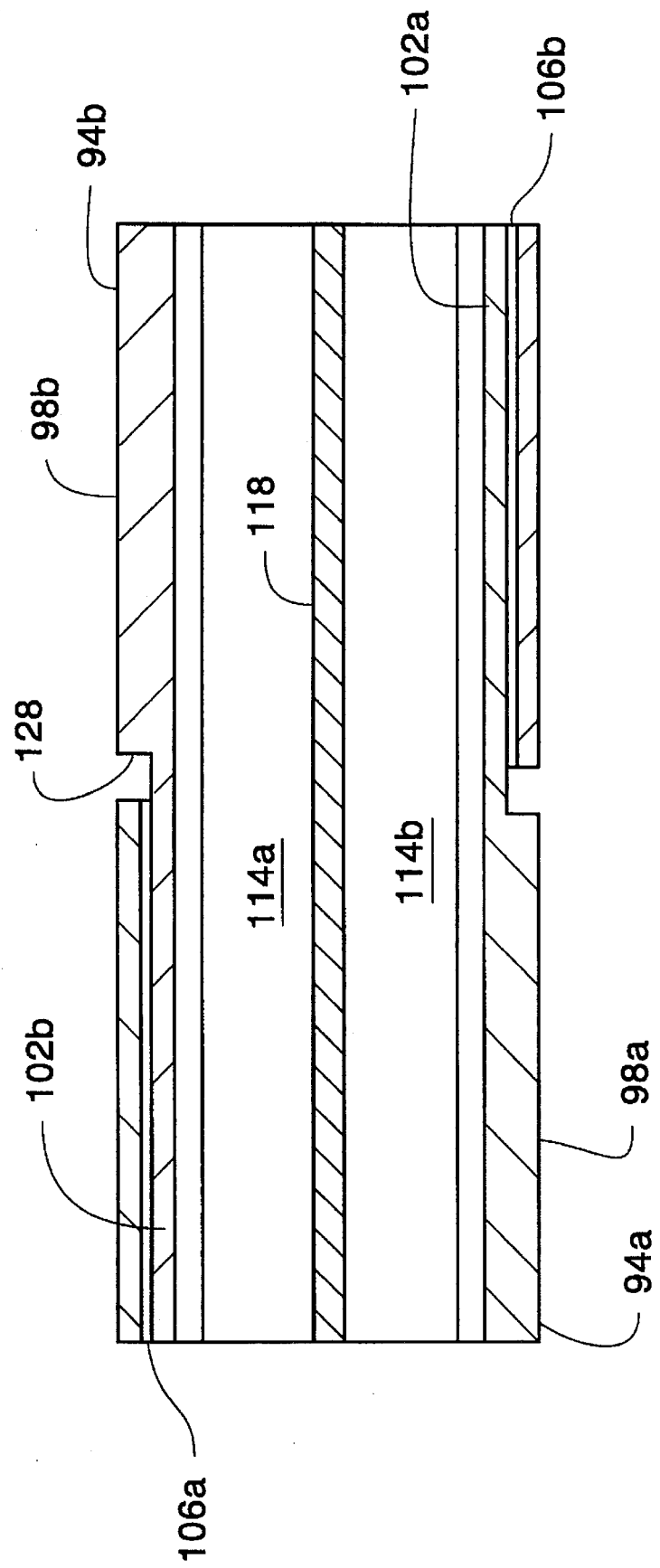
FIG. 5 is a cross-sectional view of the flexural pivot of FIG. 3 taken along line 5—5.
Figure 6:
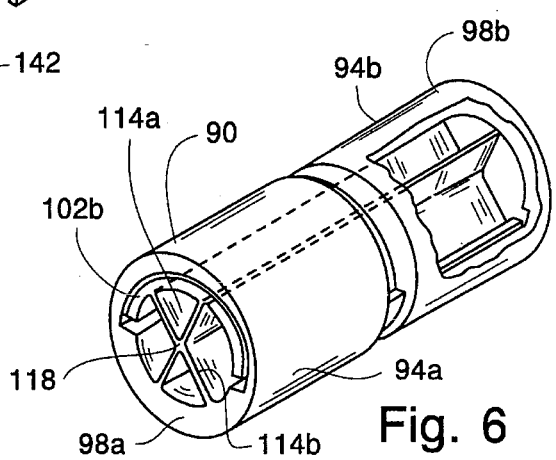
FIG. 6 is a perspective of an embodiment of a flexural pivot similar to that of FIG. 3 (fewer flexure members) with portions thereof broken away to illustrate the flexure members which interconnect the two mounts.

An integral flexural pivot is also illustrated in FIGS. 3–5, and the same type of integral flexural pivot but with fewer flexure members is illustrated in FIG. 6 (and thus is similarly numbered). The integral flexural pivot 90 includes first and second axially aligned mounts 94a, 94b, respectively, which are separated by a circumferential groove 128 and which interface with two separate structures (not shown) between which at least some degree of relative movement is desired (e.g., a fixed support and an oscillating mirror) via use of the pivot 90. The mounts 94 may be interconnected with the associated structure by a clamp or the like as is known in the art.

The mounts 94 each include a substantially cylindrically-shaped end section 98 and an arcuately-shaped tab 102 (e.g., an arc length of less than 180°) which extends into the interior of the other and oppositely positioned mount 94. Each tab 102 is received within an arcuately extending (e.g., about 180°) end groove 106 formed on the end section 98 of the opposing mount 94. A space 110 separates the two tabs 102 at a location intermediate the ends of the pivot 90.

First, second, third, and fourth flexure members 114a–d extend between and are integrally formed/interconnected with radially aligned or opposing portions of each of the mounts 94. These flexure members 114 run substantially the entire length of the mounts 94. In addition, the flexure members 114 intersect to define and are integrally formed along the entire length of an intersection 118 which is positioned along an axis 122. An interior, generally triangular-like, opening 126 (i.e., having a continuous and closed perimeter or boundary) is positioned between adjacent portions of the flexure members 114. Consequently, when the mounts 94a, 94b are attached to their respective structures, they are able to move relative to each other, typically by a rotation substantially about the axis 122 coinciding with the intersection 118, by a flexing of the members 114. The degree of rotation is dictated by the arcuate length of the end grooves 106 and the arcuate length of the associated tab 102. Although four flexure members 114a–d are illustrated for the pivot 90, it will be appreciated that more or less may be utilized depending upon the application and/or the desired performance characteristics (e.g., FIG. 6 where there are only two flexure members 114a–b illustrated therein).

Figure 7A:
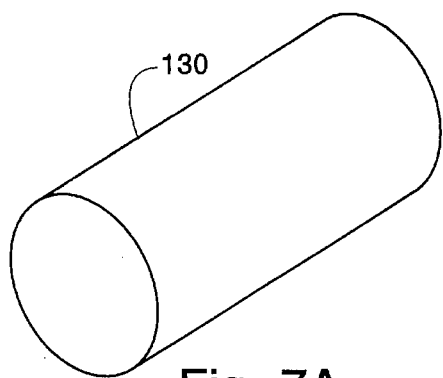
FIGS. 7A–E are sequential views of one method for making the flexural pivot of FIGS. 3 or 6.
Figure 7B:
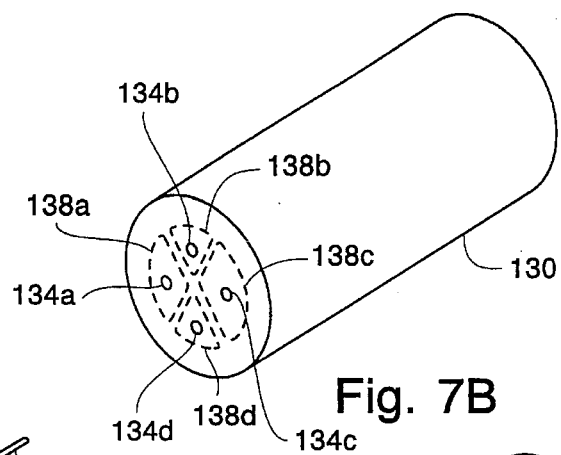
Figure 7C:
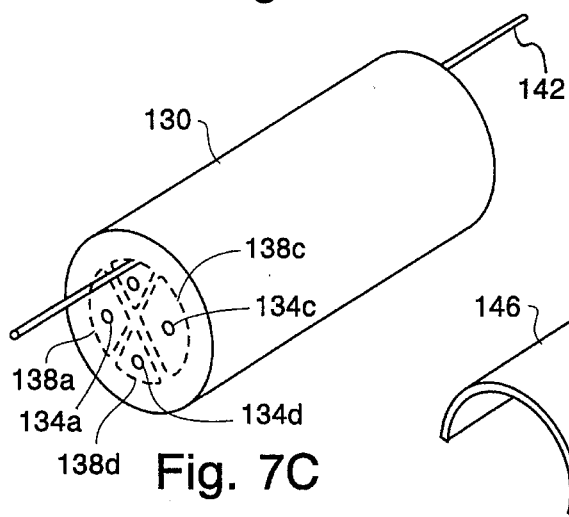

Referring to FIGS. 7A–E, one method for making the integral flexural pivot 90 with two flexure members 114a–b is illustrated therein. Initially, since the flexural pivot 90 is integral as previously noted, it is formed from a single piece of feed stock 130. The outer cylindrical surface of the feed stock 130 may be turned to the desired diameter before or after the pivot 90 is formed therefrom, such as by utilizing a lathe. Referring to FIG. 7B, four pilot holes 134 are formed in the feed stock 130, such as by drilling plunge electron discharge machining, or the like. In order to create the generally triangularly-shaped openings 126 between adjacent portions of flexure members 114 and which are illustrated by the dashed lines 138 in FIG. 7B, these pilot holes 134 must of course be enlarged. Referring to FIG. 7C, a wire electrode 142 may be fed through a given pilot hole 134 and advanced to cut along the associated dashed line 138 and create the opening 126 via wire electron discharge machining. This procedure may be repeated the required number of time to form the desired number of flexure members (two in the embodiment illustrated in FIGS. 7A–E and the structure left between adjacent openings 126) within the single, generally cylindrical piece of feed stock 130.

Figure 7D:
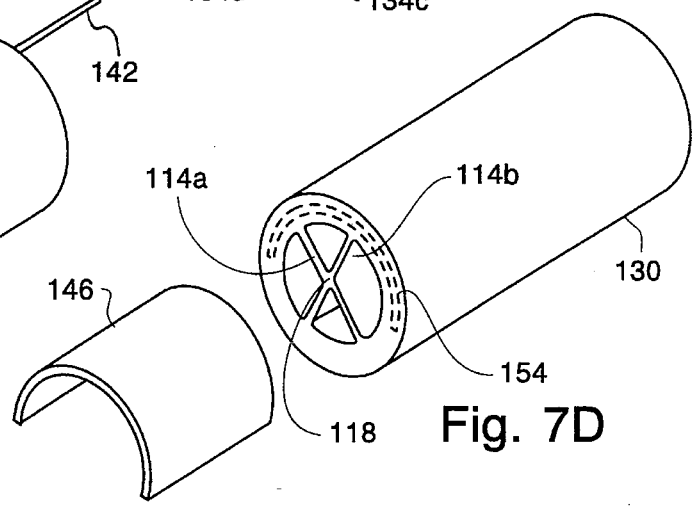

Referring now to FIG. 7D, an arcuately-shaped plunge electrode 146 having a profile and arcuate length approximating that of the end grooves 106 is advanced slightly more than half way into one end of the feed stock 130 to remove material and thereby form an arcuate, axially extending slot 150, illustrated in FIG. 7D by dashed line 154, via electron discharge machining. This procedure is then repeated on the opposite end of the feed stock 130 but in an opposed manner (e.g., a slot 150 is formed on the upper half of one end of the feed stock 130 and a slot 150 (not shown) is formed on the lower half of the opposite end of the feed stock 130).

Figure 7E:
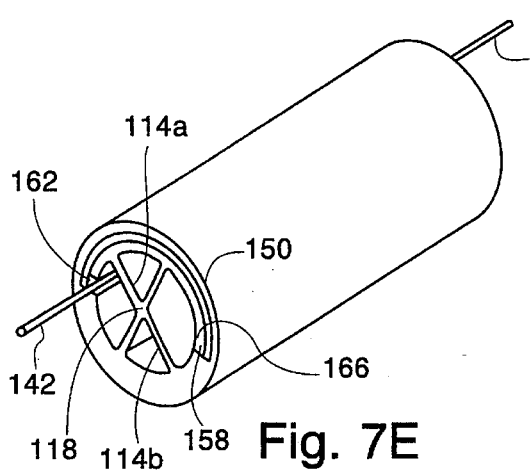

Referring to FIG. 7E, both ends of each of the slots 150 are interconnected with the adjacent opening 126 by inserting the wire electrode 142 into the adjacent opening 126 or in the slot 150. The wire 142 is then advanced along the dashed lines 166 to cut out segments 158 from the feed stock 130 to thereby form an axial space 162 via electron discharge machining. The circumferential groove 128 (FIG. 3) is then cut into the feed stock 130 at a location substantially midway between its two ends to meet the slots 50. Consequently, this forms the two mounts 94 and their corresponding end sections 98 for providing a mounting surface and tabs 102 which project axially into the interior of the end section 98 of the opposing mount 94.

Based upon the foregoing, it will be appreciated that the method of FIGS. 7A–E also provides for an integral flexural pivot 90. That is, like the pivot 10, there are no mechanical joints between the various parts of the pivot 90 (e.g., between the mounts 94 and the flexure members 114, between the flexure members 114 at the intersection 118). Again, although electron discharge machining may be advantageously used to form the integral pivot 90, due to the formation of a recast layer, the above-identified finishing processes should be used.

The above-identified structures for the flexural pivots 10, 90 provide several advantages. Initially, the flexural pivots 10, 90 are integrally formed. As such, the flexural pivots 10, 90 avoid the often cumbersome assembly procedures associated with many flexural pivots which utilize multiple parts which must be assembled and mechanically joined. In addition and with further regard to the integral nature of the pivots 10, 90 they utilize no mechanical joints (e.g., brazes) between their respective flexure members and mounts, and thus the potential for fracturing in these regions is substantially reduced. Furthermore and as noted, the flexure members of the pivots 10, 90 are joined together along an entire length of the associated intersection and extend substantially the full length of associated mounts. As such, the potential for decentering during the noted relative movement between the mounts of the associated pivot 10, 90 is reduced. Although this may achieved by only attaching the flexure members of the pivots 10, 90 together at only intermittent locations (not shown), greater strength and better stiffness characteristics are achieved in the illustrated manner. That is, the combination of the flexure members being joined along an entirety of the length of the associated intersection and extending the full length of the associated mounts and being connected thereto results in increased structural stiffness in the directions other than torsional.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. A flexural pivot, comprising:

a first mount comprising a first hollow cylindrical mounting portion and a first tab extending from an end of said first cylindrical mounting portion, wherein said first cylindrical mounting portion comprises a first interior surface and a first exterior surface, wherein said first tab comprises a first interior surface and a first exterior surface;

a second mount comprising a second hollow cylindrical mounting portion and a second tab extending from an end of said second cylindrical mounting portion, wherein said second cylindrical mounting portion comprises a second interior surface and a second exterior surface, wherein said second tab comprises a second interior surface and a second exterior surface, wherein said first tab of said first mount extends into an interior of said second cylindrical mounting portion of said second mount whereby said first exterior surface of said of said first tab interfaces with said second interior surface of said second cylindrical mounting portion, wherein said second tab of said second mount extends into an interior of said first cylindrical mounting portion of said first mount whereby said second exterior surface of said second tab interfaces with said first interior surface of said first cylindrical mounting portion, wherein said first and second cylindrical mounting portions of said first and second mounts, respectively, are axially aligned; and first and second flexure member integrally interconnected with each of said first and second mounts, said first flexure member being integrally interconnected with said first interior surface of said first cylindrical mounting portion of said first mount and being integrally interconnected with said second interior surface of said second tab of said second mount, said second flexure member being integrally interconnected with said second interior surface of said second cylindrical mounting portion of said second mount and being integrally interconnected with said first interior surface of said first tab of said first mount, wherein said first and second flexure members cross at an intersection and are integrally interconnected with each other along substantially an entire extent of said intersection, wherein said first and second mounts are movable relative to each other by a flexing of said first and second flexure members by a rotation of said first cylindrical mounting portion relative to second cylindrical portion substantially about said intersection and wherein said flexural pivot is integrally formed from a single piece of feed stock as a unitary structure which is free from any mechanical connection.

2. A flexural pivot, as claimed in claim 1, wherein:

adjacent ends of said first and second cylindrical mounting portions are axially spaced.

3. A flexural pivot, as claimed in claim 1, wherein:

said first and second flexure members are each substantially the same length, and wherein said intersection has a length substantially equal to a length of said flexural pivot.

4. A flexural pivot, as claimed in claim 1, wherein:

a length dimension of each of said first and second mounts is substantially parallel with said intersection about which said first mount moves relative to said second mount, wherein said first and second flexure members are each interconnected with each of said first and second mounts along substantially an entirety of said length dimension of each of said first and second mounts.

5. A flexural pivot, as claimed in claim 1, wherein:

movement of said first mount relative to second mount about said intersection causes said first flexure member to bend in a clockwise direction and said second flexure member to bend in a counterclockwise direction.

6. A flexural pivot, as claimed in claim 1, wherein:

said first interior surface of said first mounting portion and said second interior surface of said second mounting portion each comprise a recess, wherein said first tab of said first mount is disposed within said recess on said second interior surface of said second mounting portion and wherein said second tab of said second mount is disposed within said recess on said first interior surface of said first mounting portion.

7. A flexural pivot, as claimed in claim 1, wherein:

said first exterior surface of said first tab of said first mount is radially spaced from said second interior surface of said second mounting portion of said second mount and wherein said second exterior surface of said second tab of said second mount is radially spaced from said first interior surface of said first mounting portion of said first mount.

\* \* \* \* \*